Reissued June 29, 1954 Re. 23,843

UNITED STATES PATENT OFFICE 23,843

INSULATING TAPE

Ralph J. Oace, New Canada Township, Ramsey County, Robert Burns Snell, Birchwood, and Esther E. Le Page, West Lakeland Township, Washington County, Minn., assignors to Minnesota Mining & Manufacturing Company, St. Paul, Minn., a corporation of Delaware No Drawing. Original No. 2,559,990, dated July 10, 1951, Serial No. 641,000, January 12, 1946. Application for reissue July 9, 1952, Serial No. 298,013

9 Claims. (Cl. 206—59)

Matter enclosed in heavy brackets [ ] appears in the original patent but forms no part of this reissue specification; matter printed in italics indicates the additions made by reissue.

This invention relates to the insulation and protection of electrical conductors, and to insulating tape employed therein.

Synthetic polymeric materials have recently replaced rubber and guttapercha to a great extent in the insulation of wires and cables, particularly those exposed to outdoor conditions or to oils or solvents. Materials such as polyvinyl chloride and polymers of ethylene, for example, have been applied by extrusion methods to copper wires to provide insulated conductors having excellent electrical characteristics as well as good chemical and mechanical properties. Such insulated wire has been widely accepted as an improved product.

The advantages of such insulation are not fully realized, however, when splices between lengths of the wire must be covered with previously known classes of insulation. The commonly used unvulcanized rubber base electrician's tape, for example, is not resistant to oils or sunlight, and does not adhere well to the synthetic polymer insulation. The tape is also low in mechanical strength, and a bulky outer wrapping of friction tape is ordinarily required to provide compression and mechanical protection.

As an alternative to the use of rubber insulating tape, strips of polymer of the same formula as that on the insulated wire have sometimes been used. In such an application, heating and molding are necessary in order to weld the polymer together into an integral insulating layer. The process is inconvenient and time-consuming, and requires special apparatus.

*The present invention provides, for the first time, means for permanently covering, insulating, and mechanically protecting splices in polymer-covered wires as just described, by simple hand application of a single strip of stable, stretchable, retractable, pressure-sensitive adhesive tape. Our novel tape also has many additional uses, as hereinafter suggested.*

Attempts have previously been made to provide similar strips, or films, of polymer with adhesive coatings so as to avoid the necessity of the subsequent heating and molding operations in covering and insulating wire splices. For example, polyvinyl chloride plasticized with not more than 20 parts of the usual plasticizer such as tricresyl phosphate or dioctyl phthalate has been sheeted out in roll form in thicknesses up to 4 mils or greater, and coated with a specific pressure-sensitive adhesive consisting of rubber, polyisobutylene, and a resinous material, in an attempt to produce a transparent flexible adhesive tape or sheet. With this amount of plasticizer, however, the sheet is found to be quite stiff and rigid. Very high stress is required to obtain any appreciable elongation; for example, a strip one inch in width and .004 inch in thickness of a mixture of 100 parts of an 89:11 vinyl chloride-vinyl acetate copolymer and 20 parts of dioctyl phthalate required a stress of 30 lbs. to produce even as little as 10% elongation. Increased elongation results in a whitening of the film, and the stretched film will then no longer retract to its original length at room temperature. Films, or coated adhesive tapes, having these properties cannot readily be applied by hand to wire splices or the like. While thinner films of similar composition might conceivably be used because of their reduced strength per unit of width, the low elasticity still precludes the acceptance of such tapes for applications such as the covering of wire splices. In addition, thicknesses of at least about four mils, and even up to twelve mils or somewhat higher, are generally preferred by electricians because of the reduced number of turns required for adequate insulation, as well as the absence of the flimsiness characteristic of thinner films.

Films have also been prepared with increased amounts of dioctyl phthalate or the like in an attempt to reduce the stress requirements and improve the elasticity. Thus, a composition consisting of 100 parts of a vinyl chloride polymer and 33 parts of dioctyl phthalate was calendered to a thickness of four mils and coated with a pressure-sensitive adhesive as hereinabove described. While the physical properties of the film were much improved, it was found that this particular adhesive as well as various other pressure-sensitive adhesives rapidly became soft and "pasty" when in contact with this or other vinyl polymer films containing more than about 20 parts of liquid type plasticizers. The resulting tape, when wound under tension around a splice or bundle of wires, soon loosened and became ineffective. This tendency was increased with even slight increase in temperature above normal room temperature.

The present invention avoids these and other defects of previously known insulating and binding materials of the type described, and provides, among other things, an improved insulated spliced electrical conductor which is electrically, mechanically and chemically effective, and which may be readily and quickly prepared without the use of special procedures or equipment.

These unique and valuable results are obtained by utilizing an insulating tape in the form of a relatively thick but easily stretchable and highly elastic pressure-sensitive adhesive tape comprising a well-bonded, water-insoluble, non-corrosive, normally tacky and pressure-sensitive adhesive coating on a plasticized vinyl chloride polymer film which is in permanent equilibrium with the adhesive. By "permanent equilibrium" it is meant that the pressure-sensitive adhesive layer neither softens (becomes "pasty") nor loses tackiness (becomes non-adherent) on prolonged contact with the backing or film layer. The adhesive remains aggressively tacky, and also remains "eucohesive" (by which it is meant that it is more cohesive than adhesive such that offsetting or transfer of adhesive material does not result when the tape is unwound from rolls or removed from surfaces to which temporarily applied and can be handled without transfer of adhesive material to the fingers).

In order to secure permanent equilibrium between backing and adhesive, we employ with the vinyl chloride polymer a combination of modifiers including a substantial but minor amount (not to exceed about 20 parts per 100 parts of the vinyl polymer) of a low molecular weight liquid plasticizer such as dioctyl phthalate, together with a substantially equal or somewhat greater amount of a high molecular weight resinous type plasticizer, the amount of the latter in any event being sufficient, together with the liquid plasticizer, to provide the desired degree of stretch in the final film. "Paraplex G-25" is a preferred example of a suitable resinous type plasticizer. It is sold by Resinous Products & Chemicals Corp., and is a soft, viscous alkyd resin having a specific gravity of 1.06, and an acid number of not more than 2.0; it is soluble in esters, ketones, aromatic and chlorinated hydrocarbons. Another high-molecular-weight plasticizer material which has been found useful in providing suitably stretchable and elastic vinyl polymer films is polymerized ethyl acrylate. Another example is polymerized vinyl butyl ether.

While resinous or high molecular weight modifiers such as "Paraplex G-25" are themselves capable of producing the desired degree of strength, stretch and elasticity in vinyl chloride polymer films, and furthermore are generally classed as "non-migrating" or "permanent" type modifiers or plasticizers, it is surprisingly found that these materials do not provide for permanent equilibrium of adhesive and backing as herein defined. Instead, it has been shown that pressure-sensitive adhesives in prolonged contact with highly stretchable and elastic films consisting solely of vinyl polymer and resinous modifier lose a great deal, if not all, of their initial tackiness or pressure-sensitivity. When tape made in this way is unwound from roll form, after a moderate period of storage, and applied to a splice, it does not adhere either to the electrical conductor or to its own backing, and hence is of no value as an insulating and protective coating.

The present invention provides an electrical insulating tape having properties of stretch and elasticity which render it highly effective for wrapping wire and cable splices. The tape is stretchable to the extent of at least about 50% at room temperature as measured in a tensile tester (such as a Serigraph Model I-P-4, manufactured by the Henry L. Scott Co. of Providence, R. I.). The tape can be readily stretched to this extent by pulling between the hands. In fact, the invention provides tapes which are stretchable to the extent of at least about 100%, which is preferred. The elasticity of the tape is a valuable feature in making possible snug wrappings and coverings. The present tape is highly elastic as shown by the fact that when a strip is elongated 30% at room temperature and then released it will retract at room temperature to substantially the original length. The invention provides tapes that will substantially completely retract when elongated as much as 50% or even more. The method employed for making such retraction tests of elasticity is as follows. A number of tape lengths are cut. Each length is suspended from an upper clamp and is provided with a light clamp (weighing about 10 grams) at the lower end to provide means for applying a weight. Each tape strip is 1 inch wide and 5 inches long between clamps. Weights of various amounts are applied to the different samples to determine what weight is needed to produce the desired elongation (30%, for example) in 15 seconds. In the case of this sample, the weight is promptly removed at the end of the 15 seconds, and the length of the tape between clamps is measured at different time intervals to determine the retraction. The weight of the lower clamp is relatively so minute that it does not affect the result.

The preferred thickness of the backing film for the electrical tape is 4 to 20 mils. A thickness of about 5 to 10 mils is generally most useful.

The values of caliper, stretchability, flexibility, elasticity, adhesion, electrical properties, chemical stability or inertness, solubility, and other properties of the insulating tapes are designed and selected for greatest utility in the wrapping and protecting of splices in synthetic polymer insulated copper wire, as previously indicated. Some or all of these properties render the product useful for other purposes. For example, the adhesive tape may be used to bind together a number of insulated electrical conductors into a permanently compact, flexible, oil-resistant bundle or harness, by spirally winding such a bundle with a single overlapping strip of the tape applied under considerable tension. A similar spiral winding on metal racks employed in electroplating operations provides a chemically resistant coating which remains firmly attached to the rack during immersion in the plating bath. Single thicknesses of the tape are useful as abrasion or wear-resistant adherent surface coatings on flat or curved surfaces.

The following examples of insulating tapes in the form of pressure-sensitive adhesive tapes having a vinyl polymer film base were prepared with a vinyl chloride-vinyl acetate copolymer softening at about 280° F. and in which the ratio of vinyl chloride to vinyl acetate was approximately 89:11. The commercially available "Vinylite VYNS," sold by Carbide and Carbon Chemical Corp., is a suitable copolymer corresponding to this description. Other equivalent materials include copolymers having other vinyl chloride-vinyl acetate monomer ratios, such as 95:5. Polyvinyl chloride itself is satisfactory in many formulations, as are many of the copolymers of vinyl chloride and vinylidene chloride, of which one example is "Geon 200-X-6," a vinyl chloride-vinylidene chloride copolymer having a softening temperature of about 260° F., sold by B. F. Goodrich Co. Polymers softening at 300° F. or higher are ordinarily to be preferred where extremely high heat resistance solvent resistance, and the like are essential.

Many liquid plasticizers other than the dioctyl phthalate of the various examples may be substituted therefor. The plasticizer must be compatible with the vinyl polymer, and must be sufficiently low in volatility so that it is not driven off during milling and calendering, or during subsequent storage and use. Tricresyl phosphate, dibutyl phthalates, and butyl phthalyl butyl glycollate, for example, appear to be equally effective in most of the compositions herein described. All of these compounds are capable of producing pastiness in water-insoluble pressure-sensitive adhesives coated on vinyl backings when used in proportions greater than about 20 parts per 100 parts of the vinyl polymer.

Likewise, various compatible non-migrating resinous or high molecular weight modifying materials having a plasticizing effect on the vinyl polymer employed may be substituted in whole or in part for the specific alkyd resin hereinbefore mentioned. Ethyl acrylate polymer has been found useful, as previously noted; this modifier has somewhat less tendency to cause tack loss than does the "Paraplex G-25," hence may be used in even greater amounts in many formulations. A resinous material having properties essentially equivalent to Paraplex G-25 for our purposes has been prepared by heating together sebacic acid, propylene glycol, and ethylene glycol in a 10:9:1 molar ratio to a low acid number.

It will be understood that, where specific ratios of specific polymers, low molecular weight plasticizers, and high molecular weight plasticizers are described in the examples, substitution of equivalent but somewhat different materials may require alteration of these ratios in order to obtain equivalent results, all in conformity with well-recognized principles.

Various modifying agents which impart specific properties to the film may be added if desired. For example, a small amount of calcium stearate added prior to milling and calendering acts as a stabilizer in preventing darkening of the vinyl polymer or of the film. Other examples are lead silicate, calcium silicate, and triethanolamine.

In general, the tape products herein described are most conveniently and economically prepared by a series of steps including pre-mixing, milling, and calendering the vinyl polymer-plasticizer mixture into continuous film form, temporarily attaching the film to a carrier belt or web, coating the exposed surface of the film with an adhesive primer and subsequently with a pressure-sensitive adhesive, removing the coated film from the carrier, slitting into narrow widths, and winding the resulting adhesive tape into roll form on suitable cores. In place of calendering, other means may be employed for forming the film. Deposition from solution in a suitable volatile liquid vehicle, followed by heating to remove the vehicle and, where necessary, to homogenize the film, has some advantages, particularly in the case of the thinner films. However, the action of the calender or similar devices seems to impart some additional and desirable properties to the resulting film, particularly with respect to stretchiness and elasticity, and such methods are generally to be preferred.

Where a varnished cambric or Holland cloth carrier belt is used, sufficient adhesion of film to belt may be obtained simply by combining the two on the bottom roll of the calender under a light pressure and with the roll at a temperature of the order of 110° F. A heavy paper web with a light weight surface coating of a low tack pressure-sensitive adhesive may economically replace the varnished cambric. In any event, the carrier web is simply an aid to the successful commercial coating of the highly stretchable film, and may be dispensed with where other suitable methods of handling this type of material are available.

Primer and adhesive compositions are preferably, but not necessarily, applied from solution or suspension in a volatile liquid vehicle, as shown in the examples. The volatile vehicle is removed after each coating operation, preferably by evaporation at elevated temperatures.

Example 1

A mixture of 700 parts by weight of "Vinylite VYNS," 200 parts of "Paraplex G-25," 100 parts of dioctyl phthalate and 25 parts calcium stearate was milled together on a rubber mill, previously heated to 250° F., until homogeneous, and was then calendered to a thickness of 4 mils. The resulting transparent film was lightly bonded to a varnished cambric carrier web, and was then primed, after which it was coated with a pressure-sensitive adhesive. The primer was made by mixing 985 lbs. of an ammoniacal casein solution containing 80 lbs. of casein with 624 lbs. of an aqueous dispersion containing 38% by weight of a coplymer of 50 parts butadiene and 50 parts styrene. The primer coating was dried to remove the water, resulting in an extremely thin primer film. The formula of the pressure-sensitive adhesive was as follows:

| | Parts by weight |
|---|---|
| Rubbery butadiene-styrene copolymer | 100 |
| Zinc oxide | 5 |
| Titanium dioxide | 10 |
| Yellow pigment | 0.3 |
| Oil-soluble heat-reactive phenol-aldehyde resin | 12 |
| Ester gum | 40 |
| Paraffin oil | 25 |
| Soft coumarone-indene resin | 40 |
| Heptane | 300 |
| Alcohol | About 10 |

In compounding the adhesive, the copolymer and pigments were first milled together. The mill base was then blended with the ester gum, paraffin oil, coumarone-idene resin, and finally with the phenol-aldehyde resin in a heated heavy duty internal mixer. After a brief further heating at a higher temperature, the batch was cooled. The heptane was then added in small portions, and sufficient alcohol was finally added to bring the viscosity to the proper value for coating. The primed film was coated with the adhesive solution, followed by drying to remove the solvent. About 6.5 to 7.5 grains of adhesive, on the dry basis, were applied to 24 square inches of the film.

The coated film was removed from the temporary liner and slit into narrow widths. The resulting tape was highly stretchable and elastic, and provided an excellent insulating and protecting covering when wound around an electrical conductor. On an irregular surface, such as a wire splice, the elasticity or regain was sufficient to provide an extremely compact covering. The tape was found to have at least about 100% stretch, and a tensile strength of about 20 lbs. per inch width.

Strips of the tape were stretched to 20% and to 50% elongation, and were then allowed to retract under no load. The strips returned to their initial length in 15 to 30 minutes and in 12 hours, respectively.

An adhesive tape was similarly prepared from a film in which the same polymer, resinous plasticizer, and liquid plasticizer were in the relative proportion of 100:29.5:17.6. This film was somewhat softer and more readily stretchable. However, the adhesive coating was in permanent equilibrium with the backing, as shown by the fact that after one year of natural ageing at room temperature the adhesion and firmness values of the pressure-sensitive adhesive coating remained unchanged.

Increasing the plasticizers in the above film to a final formula of 100:30:20 yielded a composition which, in the form of 4 mil film, was found to be somewhat weak. However, this composition produced a reasonably satisfactory backing in thicknesses of about twelve mils. Pressure-sensitive adhesives coated on this backing were found to soften to a very slight extent after prolonged ageing in the final tape rolls, but the tape remained fully satisfactory for such uses as the binding of wire harnesses and the like.

On the other hand, films prepared from the above ingredients in the proportions 100:26.5:6.7, primed, and coated with adhesive, were found to be too tough and inelastic for most uses, even though the adhesive coating remained tacky and in good condition. When such films were elongated to more than approximately ten or twenty per cent of their initial length, they were found to acquire a permanent set and would not then retract to their original length. A slight increase in the proportion of dioctyl phthalate, for example, to about eight or ten parts, improved the films in this respect. On the other hand, adhesives coated on films plasticized with from 40 to 70 parts of "Paraplex G-25" and in the absence of the dioctyl phthalate were soon found to become deficient in tackiness.

Example 2

The plasticized vinyl polymer film of Example 1 was primed with a synthetic rubber-resin primer composition applied from solution in organic solvent, and coated with a natural rubber base pressure-sensitive adhesive. The resulting transparent pressure-sensitive adhesive tape was useful for wrapping splices in electrical conductors and for other purposes. The adhesive and backing were found to be in permanent equilibrium. The transparent nature of the tape was advantageous where it was desirable periodically to inspect the protected surface.

The composition used as the primer in this example consisted of a solution, in a mixture of 100 parts toluol and 20 parts methyl ethyl ketone, of 20 parts of a pure hydrocarbon thermoplastic terpene resin having a melting point of 115° F. and a zero acid number, and 25 parts of a rubbery butadiene-acrylonitrile copolymer.

The transparent pressure-sensitive adhesive was prepared by blending 238 lbs. of latex crepe rubber, 175 lbs. of the thermoplastic terpene resin having a melting point of 115° F., 2.88 lbs. of tetramethyl thiuram disulfide, and 3 lbs. of an antioxidant such as "Flectol H" (a condensation product of acetone and aniline melting at 120° C.), in solution in heptane containing a small amount of denatured alcohol as a viscosity reducing agent.

Example 3

Various pigments and colors may be added both to the backing and to the adhesive formulation of my insulating composition in order to improve the appearance, or to provide a distinctive color, or for other purposes. Heavy pigment loading of the vinyl film for example is found to improve the heat resistance.

A film twelve mils in thickness was prepared from a mixture of 700 parts "Vinylite VYNS," 200 parts "Paraplex G-25," 100 parts dioctyl phthalate, 1100 parts titanium dioxide pigment, and 30 parts calcium stearate, together with 100 parts of a mold inhibiting agent such as "Shirlan Extra" (salicyl anilide). The film was primed with the primer of Example 2 and coated with a polyacrylate base pressure-sensitive adhesive. The adhesive was composed of a copolymer of 75 parts of 2-ethylbutyl acrylate and 25 parts ethyl acrylate, tackified with a thermoplastic terpene resin, and firmed up by heating with small admixed amounts of zinc resinate and an oil soluble heat-reactive phenol-formaldehyde resin. Titanium dioxide was included as a pigment to produce a white adhesive. The produce was cut into narrow widths and wound into roll form, in this case with a varnished cambric interliner.

Samples of the tape showed approximately 100% strength at break, and had a tensile strength at break of approximately 30 lbs. per inch width. Retraction to original length from 20% elongation was complete in somewhat under five minutes, and from 50% elongation in approximately twenty-four hours.

Example 4

To produce a completely flame-resistant tape product, the primed film of Example 3 was coated with a pressure-sensitive adhesive consisting essentially of polymerized chloroprene and chlorinated diphenyl in approximately equal proportions by weight. The adhesive was applied from solution in a high aromatic content hydrocarbon solvent.

Example 5

To the film composition of Example 1 was added five parts of carbon black. The resulting film had a black glossy appearance and considerably increased tensile strength. The elasticity was somewhat reduced, but the film retracted to its original dimension from approximately 50% elongation in somewhat less than twenty-four hours.

The film was primed with the primer of Example 2 and coated with an adhesive consisting of 100 parts of a mixture of equal parts of natural rubber and Buna-S synthetic rubber, 50 parts of zinc oxide, 5 parts of carbon black, and 50 parts of heat treated wood rosin. A small amount of Flectol H antioxidant was also added, and the material was dispersed in heptane to a coatable viscosity. The resulting tape product was particularly applicable to the covering of splices in copper wires carrying an insulating coating of black pigmented plasticized synthetic polymer.

*It will be seen that hereinabove we have described various embodiments of our invention for purposes of illustration. The novel article of our invention is a broadly new article of commerce. Prior to our invention there was no electrical or plastic tape available which was similar to the product of this invention either in performance characteristics or in appearance or handling characteristics. No pressure-sensitive adhesive tape was previously available which was of suffi-*

*cient thickness (i. e., 4 to 20 mils) to provide suitable dielectric strength and yet of handling characteristics such that it was readily stretchable by hand pulling to an extent of at least 50% at room temperature and substantially completely slowly retractable from an elongation of 30% as herein specified. Again, no tape of such thickness and other properties was previously available to industry in which the backing film had high resistance to both hydrocarbon oils and water and also was in "permanent equilibrium" with the pressure-sensitive adhesive coating, so as to avoid pastiness or tack loss of the adhesive. For these and other reasons, the novel article of this invention is a commercially new thing: it is a new type of tape, actually and commercially. There is no product in the prior art which resembled it, or was able to compete with it.*

*Where the term "rubber resin type" is used in defining the adhesive layer in the claims, it simply means a normally tacky and pressure-sensitive adhesive, such as one having properties of tack, pressure sensitivity, cohesiveness, et cetera, similar to the physical characteristics possessed by rubber resin, pressure-sensitive adhesives of the prior art.*

Having described various embodiments of our invention, for purposes of illustration rather than limitation, what we claim is as follows:

1. A pressure-sensitive adhesive insulating tape wound upon itself in roll form and comprised of: a stretchable and elastic film backing having a thickness of 4 to 20 mils and formed of a homogeneous mixture primarily consisting of a stable blend of a film-forming polymer of monomers including at least a major proportion of vinyl chloride, a substantially non-volatile liquid phthalyl ester plasticizer amounting to 8 to 20 parts per 100 parts of said polymer, and a soft and viscous low-acid-number alkyd plasticizer resin in amount at least equal to the amount of said liquid phthalyl ester plasticizer, the total amount of said plasticizers being about ⅓ to ½ the amount of said polymer and the proportions being such that the adhesive tape has the properties of stretch and elasticity hereafter specified without causing pastiness or tack-loss of the contacting adhesive in the roll; and a eucohesive normally tacky and pressure-sensitive rubber-resin type adhesive coating united to the inner face of said film backing; said adhesive tape being unwindable without delamination or offsetting of adhesive, being originally stretchable by hand-pulling to an extent of at least 50% at room temperature and being substantially completely retractable from an elongation of 30% as herein specified.

2. An adhesive tape according to claim 1, wherein the adhesive includes a small proportion of an oil-soluble heat-reactive phenol-aldehyde resin.

3. An adhesive tape according to claim 1 in which the film-forming polymer is a copolymer of vinyl chloride and a minor proportion of vinyl acetate, said copolymer having a softening temperature of at least about 280° *F.* [C.].

4. A pressure-sensitive adhesive insulating tape wound upon itself in roll form and comprised of: (1) a stretchable and elastic film backing having a thickness of 4 to 10 mils and formed of a homogeneous mixture primarily consisting of a stable blend of 70 parts of a copolymer of vinyl chloride and a minor proportion of vinyl acetate, about 10 parts of a substantially non-volatile liquid phthalyl ester plasticizer, and about 20 parts of a soft and viscous low-acid-number alkyd plasticizer resin; (2) an adhesive primer coating on the inside face of the film backing adapted to increase the anchorage of the adhesive coating; and (3) a eucohesive normally tacky and pressure-sensitive rubber-resin type adhesive coating bonded to said primer coating; said adhesive tape being unwindable without delamination or offsetting of adhesive, being originally stretchable to an extent of at least 100% at room temperature and being substantially completely retractable from an elongation of 30% as herein specified.

5. An adhesive tape according to claim 4, wherein the adhesive includes a small proportion of an oil-soluble heat-reactive phenol-aldehyde resin.

*6. A pressure-sensitive adhesive insulating tape wound upon itself in roll form and comprising: (1) a water-insoluble and hydrocarbon-oil-insoluble film backing of high dielectric strength containing a stabilizer and having a thickness of 4 to 20 mils and formed of a homogeneous mixture primarily consisting of a stable blend of (a) a film-forming polymer of monomers including at least a major proportion of vinyl chloride, and (b) a substantially non-volatile plasticizing material therefor in an amount within the range of at least ⅓ the weight of said polymer but in a substantially lesser amount than said polymer and comprising at least a major proportion of a non-migrating viscous plasticizer resin, and the proportions being such that the adhesive tape has the properties of stretch, elasticity and retractability hereafter specified without causing pastiness or loss of the tack of the contacting adhesive in the roll; (2) an adhesive primer coating on the inner face of the film backing adapted to increase the anchorage of the adhesive costing; and (3) a water-insoluble normally tacky and pressure-sensitive rubber-resin type adhesive coating united to the inner face of said film backing, over said primer coating, said adhesive coating being thin in relation to said film backing; said film backing being in permanent equilibrium with said pressure-sensitive adhesive coating so as to avoid pastiness or loss of tack of the said adhesive coating and diminution of the flexibility of said film backing; said adhesive tape being unwindable from the roll without delamination of the tape or offsetting of the adhesive, being originally stretchable in widths not greater than about one inch by simple hand pulling, exercising a force of not more than about 10 to 15 pounds, to an extent of at least 50% at room temperature and being substantially completely retractable from an elongation of 30%, as herein specified; said tape being readily conformable to irregular surfaces in insulating wire splices and its elasticity, retractability and high adhesion value making it easy, in insulated splices, to produce snug wrappings and coverings, and said tape having sufficiently aggressive adhesiveness to remain tightly and snugly wrapped around splices and wires.*

*7. A pressure-sensitive adhesive tape capable of being wound upon itself in roll form and unwound therefrom without delamination or offsetting of the adhesive and comprising a water-insoluble and hydrocarbon-oil-insoluble film backing having a thickness of about 4 to 20 mils and formed of a homogeneous mixture primarily consisting of a stable blend of (a) a film-forming polymer of monomer material including at least a major proportion of vinyl chloride, and (b) a*

*substantially non-volatile plasticizing material therefor in an amount within the range of at least about ⅓ the weight of said polymer but in a substantially lesser amount than said polymer and comprising at least a major proportion of a non-migrating viscous plasticizer, and the proportions being such that the adhesive tape has the properties of stretch, elasticity and retractability hereafter specified without causing pastiness or loss of the tack of the contacting adhesive; and a water-insoluble normally tacky and pressure-sensitive rubber-resin type adhesive coating united and firmly bonded to one face of said film backing; said film backing being in permanent equilibrium with said pressure-sensitive adhesive coating, so as to avoid pastiness or loss of the tack of said adhesive coating and loss of the flexibility of said film backing; said adhesive tape being capable of being wound upon itself in roll form and unwound therefrom without delamination of the tape or offsetting of the adhesive, being originally stretchable in widths not greater than about one inch by simple hand pulling, exercising a force of not more than about 10 to 15 pounds, to an extent of at least 50% at room temperature and being substantially completely retractable from an elongation of 30%, as herein specified; said tape being readily conformable to irregular surfaces and its elasticity, retractability and high adhesion value making it easy to produce snug, smooth-fitting wrappings and coverings.*

*8. A pressure-sensitive adhesive tape capable of being wound upon itself in roll form and unwound therefrom without delamination or offsetting of the adhesive and comprising a water-insoluble and hydrocarbon-oil-insoluble film backing having a thickness of about 4 to 20 mils and formed of a homogeneous mixture primarily consisting of a stable blend of (a) a film-forming polymer of monomer material including at least a major proportion of vinyl chloride, and (b) a substantially non-volatile plasticizing material therefor in an amount within the range of at least about ⅓ the weight of said polymer but not greatly in excess of ½ the weight of said polymer and comprising at least a major proportion of a non-migrating viscous plasticizer resin, and the proportions of the said plasticizing material to said film-forming polymer being such that the adhesive tape has the properties of stretch, elasticity and retractability hereafter specified without causing pastiness or loss of the tack of the contacting adhesive; and a water-insoluble, normally tacky and pressure-sensitive rubber resin type adhesive coating united and firmly bonded to one face of said film backing, said adhesive coating being thin in relation to said film backing; said film backing being in permanent equilibrium with said pressure-sensitive adhesive coating, so as to avoid pastiness or loss of the tack of said adhesive coating and loss of the flexibility of said film backing; said adhesive tape being capable of being wound upon itself in roll form and unwound therefrom without delamination of the tape or offsetting of the adhesive, being originally stretchable in widths not greater than about one inch by simple hand pulling, exercising a force of not more than about 10 to 15 pounds, to an extent of at least 50% at room temperature and being substantially completely retractable from an elongation of 30%, as herein specified; said tape being readily conformable to irregular surfaces and its elasticity, retractability and high adhesion value making it easy to produce snug, smooth-fitting wrappings and coverings.*

*9. A pressure-sensitive adhesive insulating tape wound upon itself in roll form and comprising: (1) a water-insoluble and hydrocarbon oil-insoluble opaque pigmented film backing of high dielectric strength and having a thickness of about 4 to 12 mils and formed of a homogeneous mixture primarily consisting of a stable blend of (a) a film-forming polymer of monomers including at least a major proportion of vinyl chloride, and (b) a substantially non-volatile plasticizing material therefor in an amount within the range of at least about ⅓ the weight of said polymer but not in excess of about ½ the weight of said polymer and comprising at least a major proportion of a non-migrating viscous plasticizer resin, and the proportions of said plasticizing material to said film-forming polymer being such that the adhesive tape has the properties of stretch, elasticity and retractability hereafter specified without causing pastiness or loss of the tack of the contacting adhesive in the roll; (2) an adhesive primer coating on said film backing so as to increase the anchorage of the adhesive coating to the inner face of its backing when unwound from rolls thereof; and (3) a water-insoluble normally tacky and pressure-sensitive rubber resin type adhesive coating united to the inner face of said film backing, said adhesive coating being thin in relation to said film backing; said film backing being in permanent equilibrium with said pressure-sensitive adhesive coating so as to avoid pastiness or loss of the tack of the said adhesive coating and diminution of the flexibility of said film backing; said adhesive tape being unwindable from the roll without delamination of the tape or offsetting of the adhesive, being originally stretchable in widths not greater than about one inch by simple hand pulling, exercising a force of not more than about 10 to 15 pounds, to an extent of at least 50% at room temperature and being substantially completely retractable from an elongation of 30%, as herein specified; said tape being readily conformable to irregular surfaces in insulating wire splices and its elasticity, retractability and high adhesion value making it easy, in insulated splices, to produce snug wrappings and coverings, and said tape having sufficiently aggressive adhesiveness to remain tightly and snugly wrapped around splices and wires.*

References Cited in the file of this patent or the original patent

UNITED STATES PATENTS

| Number | Name | Date |
|---|---|---|
| 1,929,453 | Semon | Oct. 10, 1933 |
| 1,966,856 | Groff | July 17, 1934 |
| 2,010,963 | Robertson | Aug. 13, 1935 |
| 2,059,055 | Studt | Oct. 27, 1936 |
| 2,170,949 | Morgan | Aug. 29, 1939 |
| 2,312,925 | McBurney et al. | Mar. 2, 1943 |
| 2,322,903 | Wilkoff | June 29, 1943 |
| 2,332,265 | Schmidt | Oct. 19, 1943 |
| 2,349,413 | Hemperly | May 23, 1944 |
| 2,385,319 | Eustis | Sept. 18, 1945 |
| 2,395,419 | Mitchell | Feb. 26, 1946 |
| 2,429,223 | Eustis et al. | Oct. 21, 1947 |
| 2,451,182 | Taft | Oct. 12, 1948 |
| 2,462,977 | Kitchin et al. | Mar. 1, 1949 |
| 2,610,910 | Thomson | Sept. 16, 1952 |